(12) United States Patent
Foti

(10) Patent No.: US 9,143,548 B2
(45) Date of Patent: Sep. 22, 2015

(54) QUALITY OF SERVICE SUPPORT FOR MACHINE-TO-MACHINE APPLICATIONS

(71) Applicant: George Foti, Dollard des Ormeaux (CA)

(72) Inventor: George Foti, Dollard des Ormeaux (CA)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 513 days.

(21) Appl. No.: 13/734,449

(22) Filed: Jan. 4, 2013

(65) Prior Publication Data

US 2013/0179583 A1    Jul. 11, 2013

Related U.S. Application Data

(60) Provisional application No. 61/583,876, filed on Jan. 6, 2012.

(51) Int. Cl.
*G06F 15/16* (2006.01)
*H04L 29/06* (2006.01)
*H04L 29/08* (2006.01)

(52) U.S. Cl.
CPC ............ *H04L 65/80* (2013.01); *H04L 65/1016* (2013.01); *H04L 67/12* (2013.01)

(58) Field of Classification Search
USPC .................................. 709/227–228, 223–224
See application file for complete search history.

(56) References Cited

U.S. PATENT DOCUMENTS

| 2002/0120749 | A1* | 8/2002 | Widegren et al. ............. 709/227 |
| 2006/0251043 | A1* | 11/2006 | Madour et al. ................ 370/349 |
| 2008/0159232 | A1* | 7/2008 | Thalanany et al. ........... 370/332 |
| 2009/0172782 | A1* | 7/2009 | Taglienti et al. .................. 726/4 |
| 2010/0014436 | A1* | 1/2010 | Talagery ........................ 370/250 |
| 2012/0117140 | A1* | 5/2012 | Wang et al. .................... 709/201 |
| 2013/0163495 | A1* | 6/2013 | Lim et al. ...................... 370/311 |
| 2013/0339438 | A1* | 12/2013 | Cherian et al. ................ 709/204 |

OTHER PUBLICATIONS

ETSI TR 102 806 V1.1.1, User Group; Analysis of current End-to-End QoS standardization state, Nov. 2009, pp. 1-48.
Ericsson et al., Mapping aspects for ETSI M2M architecture, 3GPP PSG SA WG2 Meeting #85, May 16-20, 2011, SA WG2 Temporary document—TD S2-112291,May 11, 2011, pp. 1-11.
Niklas Blum et al., Application-driven Quality of Service for M2M Communications, 15th International Conference on Intelligence in Next Generation Networks, Oct. 4, 2011 IEEE, pp. 41-45.

(Continued)

*Primary Examiner* — Philip B Tran
(74) *Attorney, Agent, or Firm* — Alex Nicolaescu; Ericsson Canada Inc.

(57) ABSTRACT

A Quality of Service functionality is provided for Machine to machine device communications that allows a single IMS session to support a plurality of different data streams. In one embodiment a single IMS session is used to support a plurality of different data streams that arise from a single application type, while in another embodiment, a single IMS session is used to support a plurality of different data streams across a plurality of different devices and applications. Through the use of a single IMS session, signaling is reduced and QoS can be offered without impacting a large number of nodes. An IMS User Agent is deployed to aid in providing this functionality.

17 Claims, 10 Drawing Sheets

(56) References Cited

OTHER PUBLICATIONS

Rongduo Liu et al., M2M-Oriented QoS Categorization in Cellular Network, 7th International Conference on Wireless Communications, Networking and Mobile Computing (WICOM), Sep. 23, 2011 IEEE, pp. 1-5.
International Search Report from corresponding application PCT/IB2013/050106.

* cited by examiner

QUALITY OF SERVICE SUPPORT FOR MACHINE-TO-MACHINE APPLICATIONS

CROSS REFERENCE TO RELATED APPLICATIONS

This application claims the benefit of priority from U.S. Provisional Patent Application No. 61/583,876, filed Jan. 6, 2012, the contents of which are expressly incorporated herein by reference.

TECHNICAL FIELD

This disclosure generally relates to the support for Quality of Service (QoS). More particularly, this disclosure relates to support for QoS in communications related to Machine-to-Machine (M2M) communications in an Internet Protocol Multimedia Subsystem (IMS) environment.

BACKGROUND

Machine to machine (M2M) devices (also referred to a machine-type communications (MTC) devices) are growing in importance and distribution as they provide for an improved monitoring and control infrastructure. The M2M devices serve as platforms for applications that make use of the sensors and communications equipment provided by the M2M devices. In an IMS environment, it is the application-device pairing that is considered as a unique entity, not the device itself. This can allow for the traffic of each application to be treated differently, and to be routed differently.

Many M2M devices rely on a mobile network for data connectivity. If each of these devices maintains a unique identity and freely communicates with which ever nodes it wants to, the network resources consumed by a large number of these devices quickly becomes unmanageable. To address this, there is interest in making use of already existing IP Multimedia Subsystem (IMS) network infrastructure to manage these devices. The use of the existing telecommunications infrastructure to provide services to the M2M devices allows for simplified deployment of these devices in a managed manner.

As these deployments have increased there has been increased interest in additional features for M2M services, including the ability of M2M communications to be sent with a Quality of Service. Many problems arise as a result of attempting to provide a Quality of Service guarantee between applications when the communication crosses different service capability layers (SCL) in an IMS network.

Therefore, it would be desirable to provide a system and method that obviate or mitigate the above described problems

SUMMARY

It is an object of the present invention to obviate or mitigate at least one disadvantage of the prior art.

In a first aspect of the present invention, there is provided, a method of supporting Quality of Servicee, QoS, in an Internet Mulitimedia Subsystem, IMS, network. The method comprising the steps of receiving, at a node in an IMS core network, a registration; receiving from a node associated with the received registration a request to create an IMS session to support a machine-to-machine data session; responsive to determining that a suitable IMS session already exists, modifying session information associated with the suitable IMS session to allow the suitable session to carry a content stream associated with the request to create a session, and to adjust an existing quality of service associated with the suitable session in accordance with the received request to create an IMS session.

In an embodiment of the first aspect of the present invention, the suitable IMS session contains data streams associated with a plurality of requests to create IMS sessions received from the same application type, and optionally an application ID is included in IMS session level data associated with the suitable IMS session. In another embodiment, the suitable IMS session contains data streams associated with a plurality of device and application pairings, where optionally an application ID is included with an SDP associated with the suitable IMS session. In another embodiment, the node in the IMS core network is a Proxy Call Session Control Function (P-CSCF), and where optionally the step of modifying session information includes signaling between the P-CSCF and the Policy and Charging Rule Function and the Serving Call Session Control Function. In another embodiment, the steps of receiving a registration and receiving a request to create an IMS session include receiving a registration requests and a request to create an IMS session through a message delivered using the hypertext transfer protocol. In a further embodiment, the steps of receiving a registration and receiving a request to create an IMS session include receiving a registration requests and a request to create an IMS session through a message delivered using the Session Initiation Protocol.

In a second aspect of the present invention, there is provided a method for establishing an Internet Multimedia Subsystem, IMS, session on behalf of a machine-to-machine device, the IMS session having an associated Quality of Service, QoS, policy. The method comprises the steps of receiving, from a requesting node, a request for establishment of an IMS session having a QoS policy, the requested IMS session terminating at a machine-to-machine device; registering the requested session with an instruction to a node in an IMS Core Network to modify QoS parameters of an existing IMS session in accordance with the QoS policy of the requested session; and upon receipt of an indication that the modification of the QoS parameters have been completed, creating a connection between the requesting node and a second terminal node using the existing IMS session, and informing both the requesting node and the second terminal node of the connection parameters.

In an embodiment of the second aspect of the present invention, the received request is an HTTP request received from the machine-to-machine device, where optionally the request is received from a gateway acting on behalf of the device. In another embodiment, the request is received from a network service capability layer. In a further embodiment, the node in the IMS core network is a Proxy Call Session Control Function. In another embodiment, the requesting node is one of a machine-to-machine device and a machine-to-machine device gateway, and the second terminal node is a network service capacity layer. In a further embodiment, the requesting node is a network service capacity layer and the second terminal node is one of a machine-to-machine device and a machine-to-machine device gateway.

In a third aspect of the present invention, there is provided a machine-to-machine user agent node. The user agent node comprises a network interface, a data repository and a processor. The network interface interacts with external nodes in a network. The data repository stores instructions. The processor, upon execution of instructions stored in the data repository: receives, over the network interface, requests for establishing an Internet Multimedia Subsystem, IMS, session having a Quality of Service, QoS, policy; transmits to a node in an IMS Core Network, over the network interface, a request to register the requested session with an instruction to modify QoS parameters of an existing IMS session in accordance with the policy of the requested session; and creating a connection between a node that issued the received request and a second terminal node, the connection using the existing IMS session, to satisfy the received request.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention is directed to a system and method for supporting the provision of Quality of Service for Machine-to-Machine type communications.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

Typically, support for QoS for a specific procedure, or procedures, implies that the issuer requires explicit transport related characteristics, commonly known as QoS profile, to be applied to the data transfer associated with the procedure. The procedures to which QoS profile apply are typically those procedures that involve inter-SCL communication, i.e. the hosting Service Capability Layer (SCL) is different than the issuer NA/DA/GA/SCL (Network Applications/Device Applications/Gateway Applications/and Service Capability Layer). Requested QoS can be discarded for procedures that don't involve inter-SCL communication in some embodiments due to the nature of the managed network.

Requested QoS characteristics within a procedure can include any or all of a number of QoS related options (parameters) identified by the issuer. These parameters may include guaranteed bandwidth, priority assigned to the procedure, latency, etc.

In a presently preferred embodiment, it is the responsibility of the issuer to identify the parameters of interest to be applied to the procedure of interest. In the absence of any specific QoS characteristics to be applied to a procedure, a default QoS profile can be applied. In one embodiment, the default QoS profile is subject to the issued SCL subscription with the network access provider.

Figure 1:
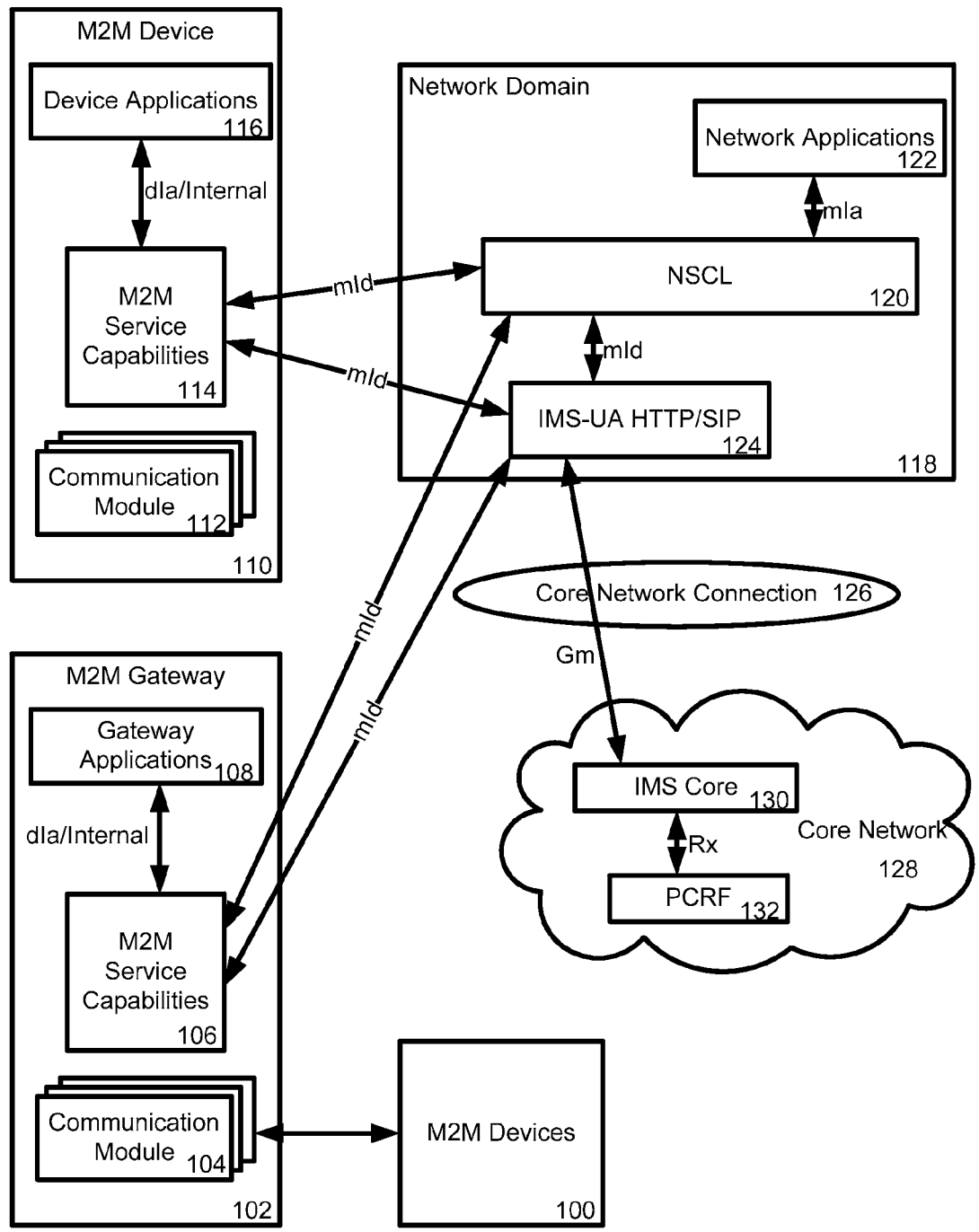
FIG. 1 is a block diagram illustrating a network architecture for supporting QoS.

As illustrated in FIG. 1, an M2M device 100 connects through an M2M Gateway 102 having at least one communication module 104. A plurality of modules 104 can be implemented to allow a gateway to connect to different M2M devices on different access networks including devices using different access network technologies. M2M Gateway 102 includes gateway applications 108 and M2M service capabilities 106. The M2M Service Capabilities 106 provide access to the Network domain 118 as will be discussed below. The M2M service capabilities 106 can communicate with nodes in the network domain 118 using a mId interface. The exemplary M2M devices 100 that are connected through an M2M gateway 102 are typically hidden from the M2M service provider. In another option, an M2M device 110 can be visible to the M2M service provider, and can connect directly to the M2M service provider. Similar to the M2M device gateway 108, these M2M devices 110 have, in the currently illustrated embodiment, communication modules 112, service capabilities 114 and device applications 116. The M2M service capabilities 114 can communicate with nodes in the network domain 118 using a mId interface. In particular, for both of the above described exemplary options, the mId interface can provide access to the NSCL 120 through which an mIa interface can provide access to network applications 122, and the IMS-User Agent (IMS-UA) SIP to HTTP gateway 124. The IMS UA 124 can access a Core Network connection 126 to provide access to the Core Network 128 and the IMS Core 130, defined in various standards such as 3GPP specifications. An Rx interface can provide access from the IMS Core 130 to a PCRF 132.

As can be seen in the exemplary embodiment of FIG. 1, the IMS core network 130 can be relied upon for at least some of the network functionality required to provide QoS support. The IMS network in conjunction with the Policy and Charging Rule Functions (PCRF) 132 typically includes all the required functionality for QoS support. The Rx interface between the IMS core network 130 and the PCRF 132 can be based on 3GPP TS 29.214: "3rd Generation Partnership Project; Technical Specification Group Core Network and Terminals; Policy and Charging Control over Rx reference point", the relevant teachings of which are incorporated herein by reference.

To enable the Network Service Capability Layer (NSCL) 120 to trigger this functionality a new functional element is introduced into the NSCL. One skilled in the art will appreciate that this functional element need not be a discrete entity, and instead can be implemented by distributing the required functionality throughout the NSCL. This element entitled "IMS User agent (HTTP to SIP gateway)" (illustrated as IMS-UA HTTP/SIP) 124 enables the NSCL 120 to emulate an IMS user. It terminates mId on one hand and interacts with the IMS core network 130 on the other hand.

The illustrated architecture does not explicitly require changes to existing interfaces other than the additional support for the requested QoS parameters for the various procedures which may be optional. This applies to all interfaces mIa, dIa, and mId. It will also be evident to one skilled in the art that SCL QoS requests can be handled by the IMS User Agent (UA) logical entity As illustrated in FIG. 1, the Network domain can make use of two external interfaces, which as illustrated are the mId and Gm interfaces. As illustrated, a south bound interface is preferably compliant to the Gm interface such as that specified in 3GPP TS 23.228: "3rd Generation Partnership Project; Technical Specification Group Services and System Aspects; IP Multimedia Subsystem (IMS); Stage 2"and 3GPP TS 24.229: "3rd Generation Partnership Project; Technical Specification Group Core Network and Terminals; IP multimedia call control protocol based on Session Initiation Protocol (SIP) and Session Description Protocol (SDP); Stage 3", the relevant contents of each being expressly incorporated herein by reference, and a north bound interface that is preferably compliant to the mId interface. An implementation may well choose not to support mId for the north bound interface and instead embed the entire IMS UA 124 logical element within the NSCL 120 or alternatively support some internal interface. The access to the IMS UA 120 is shown to be using a mId interface.

Exemplary functional behavior of the IMS UA HTTP to SIP Gateway 124 will now be discussed with relation to a number of different features.

With respect to the IMS UA Registration, the IMS UA 124 will preferably register with the IMS Core network 130 prior to initiating any other interactions with the IMS Core network. To that effect, the IMS UA, can have a public identity allocated to it by the access network provider as well as credentials for use during IMS registration for authentication purposes. This allows the IMS UA not to be owned by the access network provider. IMS registration can occur at any time before an interaction with the IMS network is required.

With respect to IMS UA Initiated Procedures, two options will be presented and discussed below. The first option is a single IMS session that is used to support multiple applications. The second option makes use of one IMS session per application.

Figure 2:
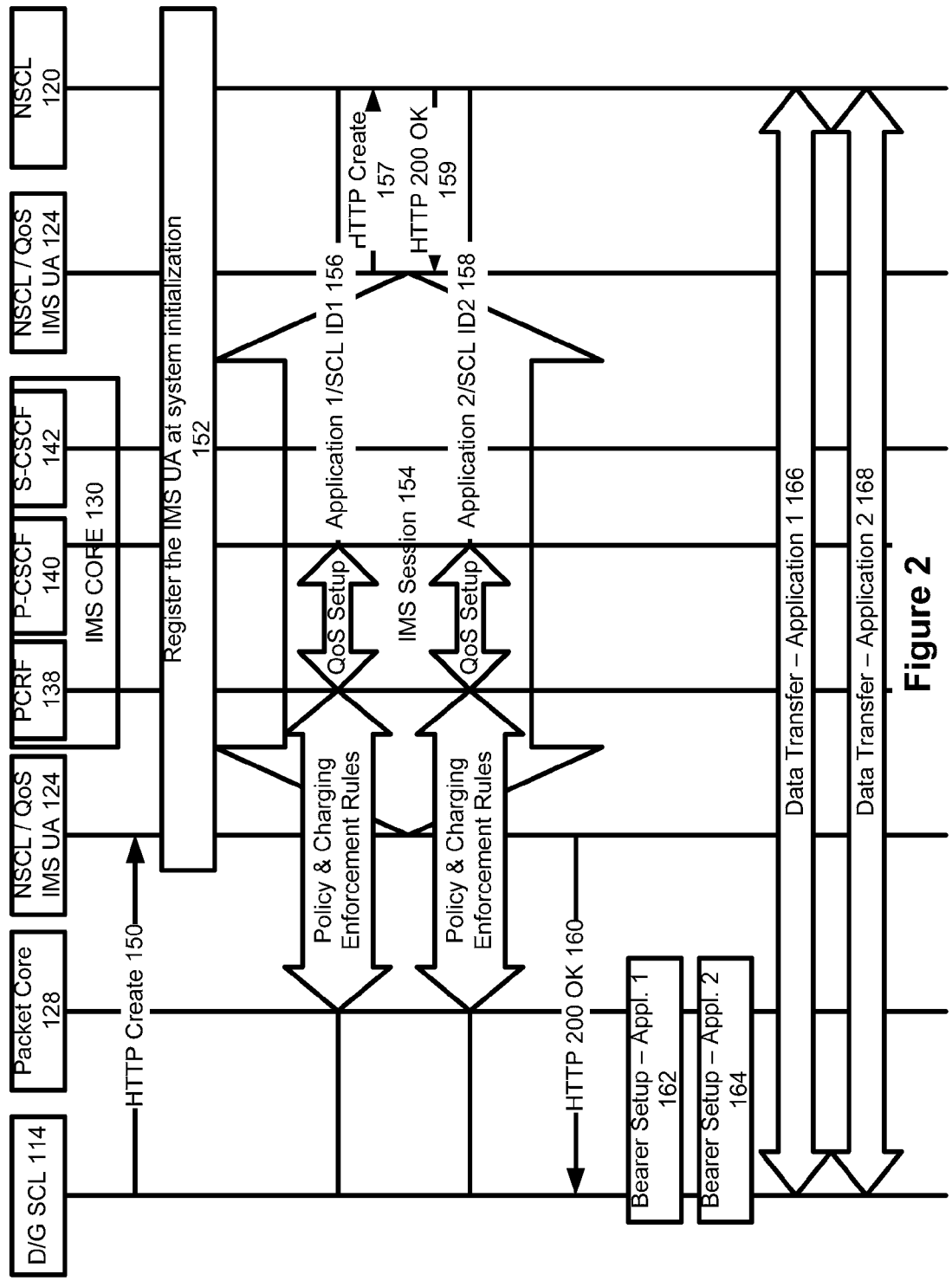
FIG. 2 is a call flow diagram illustrating an exemplary method using a single IMS session.

Discussion of the use of a single IMS session to support multiple applications is made with reference to FIG. 2. One notable characteristic of this option is that a single IMS session is used to support multiple IP flows. In the exemplary embodiment of FIG. 2, each IP flow is uniquely associated with a single M2M application. The number of simultaneous IP flows to be supported within a single IMS session is implementation dependent. As such, if need be, multiple IMS sessions can be initiated by the IMS UA. In this exemplary illustrated embodiment, the IMS UA 124 maintains a mapping between the IMS session and the applications (application IDs) using the session. Furthermore in this option, the application ID can be included at the Session Description Protocol (SDP) level thus allowing its omission at the session level.

The G/D SCL 114 sends an HTTP request 150 to the IMS UA 124 on behalf of the application. The SCL 114 initiates the request to the IMS UA 124 to fulfill a QoS profile for the request. In 152, the IMS UA 124 registers with the IMS core network 130 if it had not already done so. If the IMS UA 124 is already registered with the IMS core network 130, step 152 can be bypassed. The IMS UA 124 establishes an IMS session 154 if one is not available for use. If one is available for use, the IMS UA 136 modifies the session to add a new IP flow based on the QoS profile in the incoming HTTP request 150. During the IMS session initialization and/or modification the IMS UA 136 sends an HTTP Create message 157 to the NSCL 120, which replies with HTTP 200 OK 159 to confirm the requested QoS profile which is then reflected in the packet core network using 3GPP procedures, coordinated by the IMS UA, in that regard. The illustrated exemplary call flow shows two IP flows 156 and 158 with different QoS profiles belonging to two different M2M applications. In this exemplary embodiment, the application ID can be included at the SDP level and not the session level, as discussed above. In this illustrated embodiment, the interaction between the IMS core 130 and the PCRF 138 can be based on 3GPP TS 29.214, while the interaction between the PCRF and the packet core network for QoS enforcement is based on 3GPP TS 29.212: "3rd Generation Partnership Project; Technical Specification Group Core Network and Terminals; Policy and Charging Control (PCC) over Gx/Sd reference point", the relevant teachings of which are incorporated by reference. One skilled in the art will appreciate that the interactions between the IMS UA 124 and the NSCL 120 in this illustrative example is shown as using HTTP. The IMS UA 124 returns an HTTP 200 OK response 160 to the SCL 114. Following the successful IMS session establishment and/or modification, depending on the case, the SCL 114 establishes a bearer for application 1 162. In 164, the SCL establishes a bearer for application 2. Data transfer for application 1 can commence in flow 166 while data transfer for application 2 can commence in flow 168. One skilled in the art will appreciate that in this embodiment, a single IMS session is used to support multiple IP flows, one for each M2M application. The number of simultaneous IP flows to be supported within a single IMS session is implementation dependent. As such, if need be, multiple IMS sessions can be initiated by the IMS UA.

Figure 3:
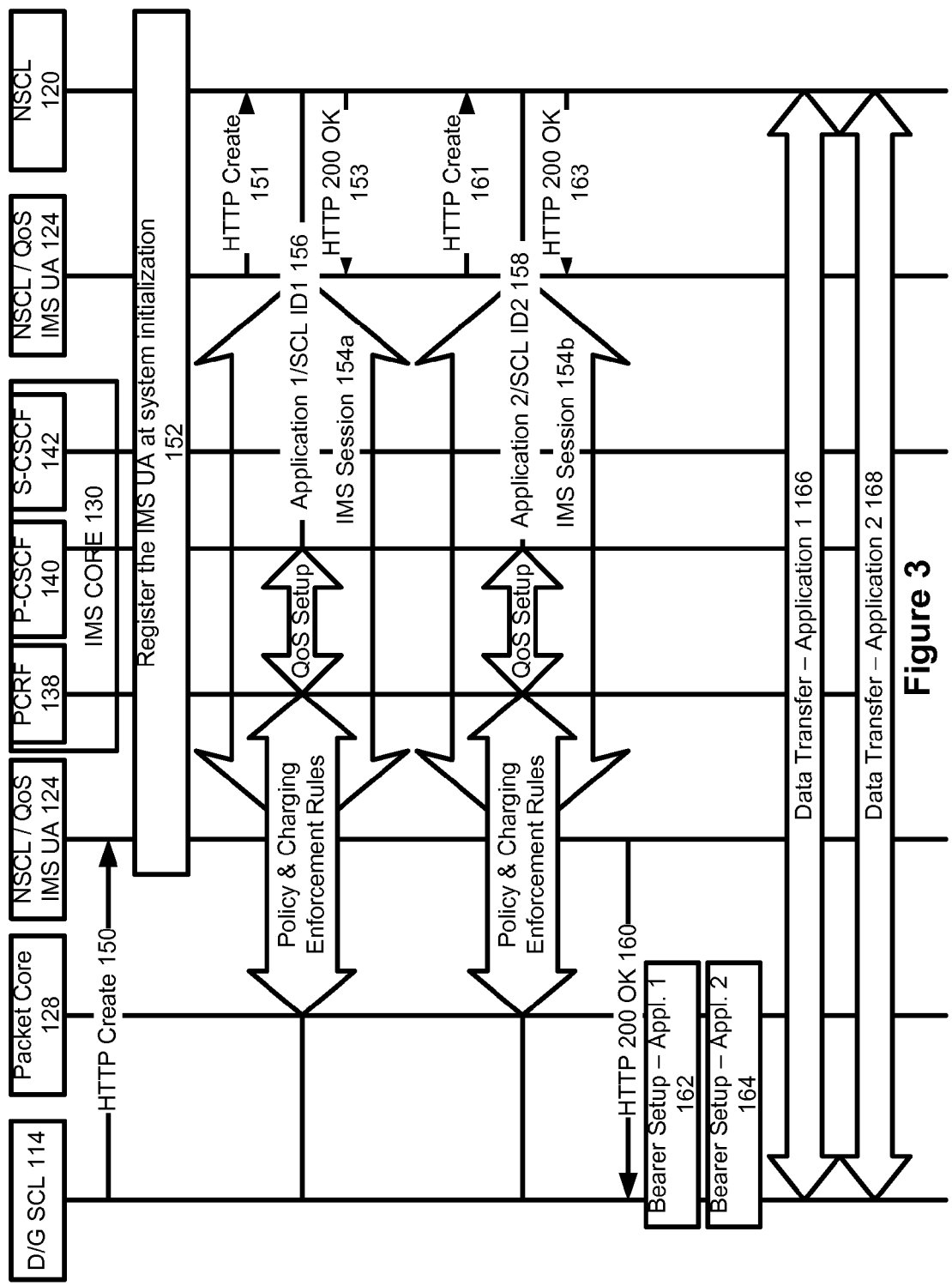
FIG. 3 is a call flow diagram illustrating an exemplary method using one IMS session per application.

The second option of using a one IMS session per application is now discussed with reference to FIG. 3. Furthermore in this option, the application ID can be included at the IMS session level.

As illustrated, in 150, the G/D SCL 114 sends an HTTP request to the IMS UA 124 on behalf of the M2M application. The SCL 114 initiates the request to the IMS UA 124 to fulfill a QoS profile for the request. The IMS UA 124 registers with the IMS core network 130 in 152 if it had not already done so. As noted above, with respect to FIG. 2, if the IMS UA 124 is already registered this step can be omitted. The IMS UA 124 establishes two IMS sessions 154a and 154b, one for each application ID 156 and 158. Each of the created IMS sessions 154a and 154b can request the QoS profile needed for the application. The application ID can be included at the session level which may allow for proper charging. In the illustrated embodiment, the interaction between the IMS core 130 and the PCRF 138 may be based on 3GPP TS 29.214, while the interaction between the PCRF 138 and the packet core network for QoS enforcement can be based on 3GPP TS 29.212. One skilled in the art will notice that in the illustrative embodiment of FIG. 3, interaction between the IMS UA 124 and the NSCL 120 is performed using HTTP as shown by HTTP create/retrieve messages 151 and 161 and the corresponding HTTP 200 OK replies 153 and 163. The IMS UA 124 returns an HTTP 200 OK response 160 to the SCL 114. The SCL 114 establishes a bearer 162 for application 1 and a bearer 164 for application 2. Data transfer for application 1 can commence over flow 166 and data transfer for application 2 can commence over flow 168.

With respect to QoS Parameters on mIa, mId, and dIa interfaces, those skilled in the art will appreciate that as the IMS core network has been used to provide support for QoS functionality, the QoS parameters can based on the Session Description Protocol relevant parameters for QoS as defined in 3GPP TS 23.228 and 3GPP TS 24.229.

Figure 4:
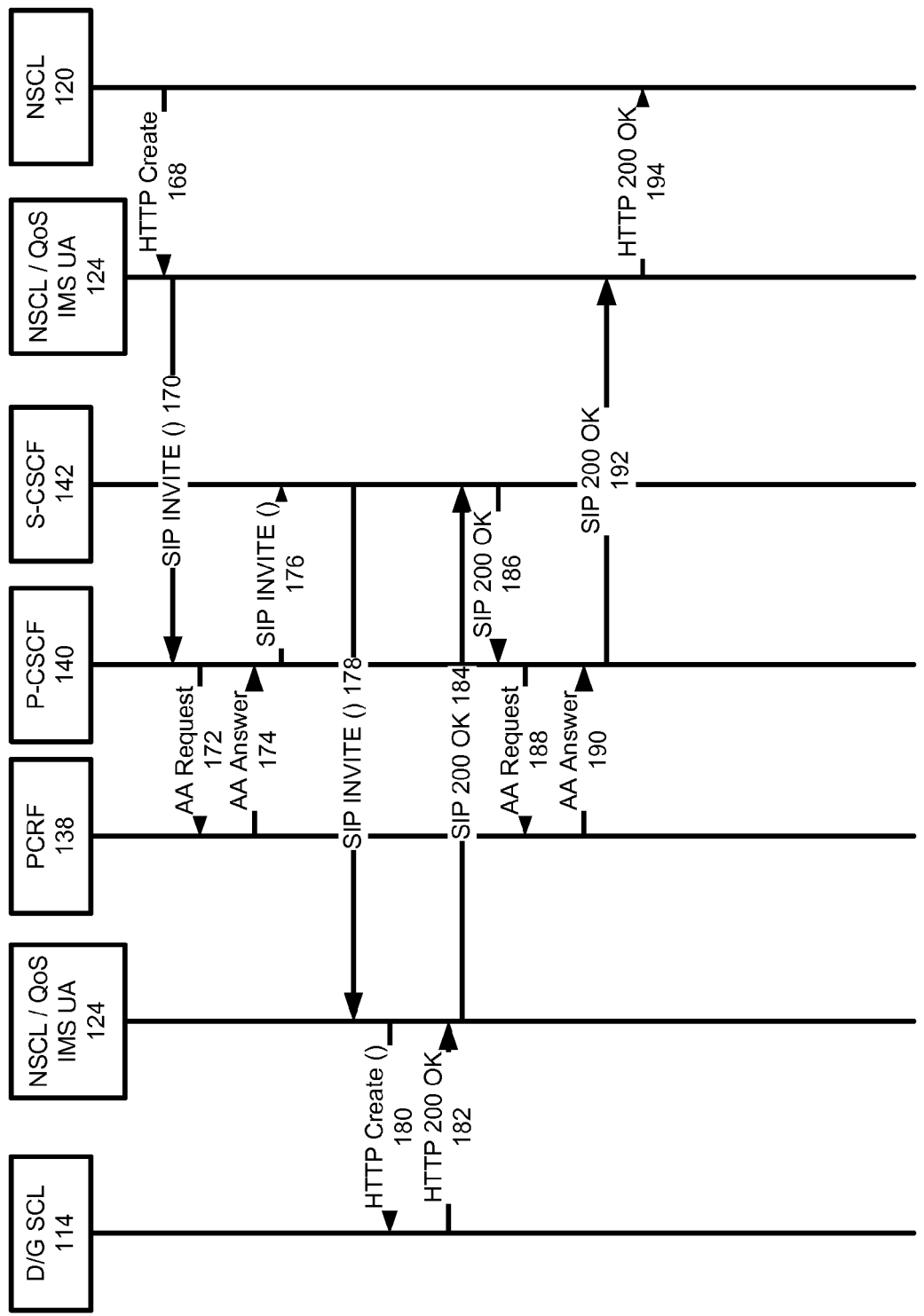
FIG. 4 is a call flow diagram illustrating an exemplary IMS setup procedure.
Figure 5:
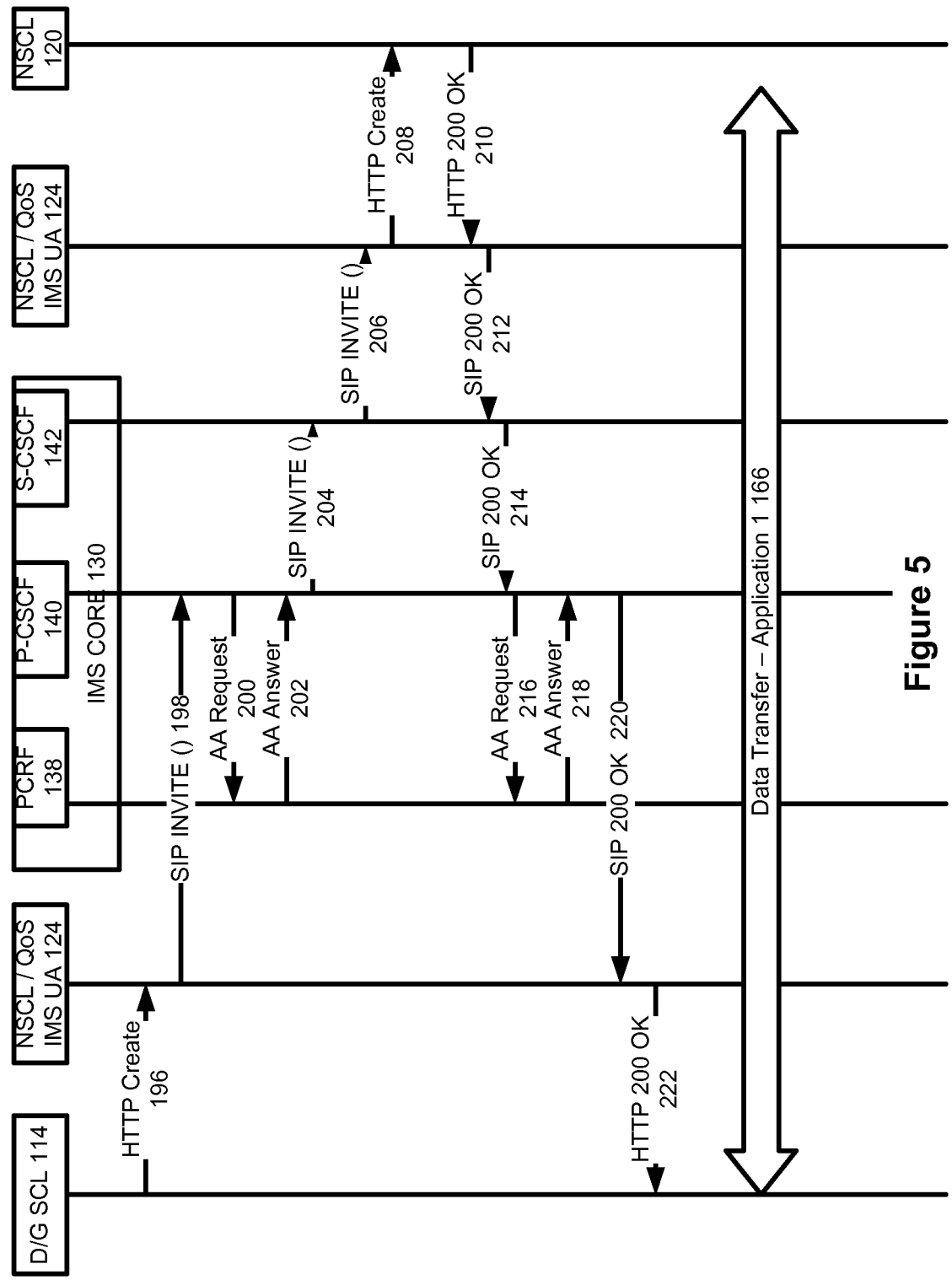
FIG. 5 is a call flow diagram illustrating an exemplary IMS setup procedure.

FIGS. 4 and 5 illustrate an exemplary embodiment for the setup of the IMS session. One skilled in the art will appreciate that FIG. 4 illustrates the IMS Session Setup in an NSCL initiated context, while FIG. 5 illustrates the IMS Session Setup in a G/D SCL initiated context.

As shown in FIG. 4, NSCL 120 issues an HTTP request such as an HTTP Create message 168 to the IMS UA 124, which in turn sends a SIP INVITE message 170 to the P-CSCF 140. The P-CSCF 140 and PCRF 138 make use of an AA Request 172 and AA Answer 174 message pair to authorize QoS parameters, and the P-CSCF issues a SIP INVITE message 176 to the S-CSCF 142. The S-CSCF 142 issues SIP Invite 178 to the IMS UA 124 which then sends HTTP Create 180 to the SCL 114. To complete the setup of the IMS session, the SCL 114 replies with an HTTP 200 OK message 182 to the IMS UA 124, which can then send a corresponding SIP 200 OK message 184 to the S-CSCF 142. A SIP 200 OK message 186 is provided to the P-CSCF 140, which then exchanges an AA Request 188 and AA Answer 190 pair with the PCRF 138 to seek final authorization and confirmation. The P-CSCF 140 issues a SIP 200 OK message 192 to the IMS UA 124 which then replies to the NSCL 120 with an HTTP 200 OK message 194.

As shown in FIG. 5, the SCL 114 issues an HTTP command such as an HTTP Create 196 to the IMS UA 124. IMS UA 124 issues a corresponding SIP Invite 198 to the P-CSCF 140. This triggers the exchange of AA-Request 200 and AA Answer 202 with the PCRF 138, followed by a SIP Invite 204 issued to the S-CSCF 142. The S-CSCF 142 sends SIP Invite 206 to the IMS UA 124 which delivers an HTTP Create 208 to the NSCL 120. To complete the setup of the IMS session, the NSCL replies with HTTP 200 OK 210 to the IMS UA 124 which then sends SIP 200 OK 212 to the S-CSCF 142, which sends SIP 200 OK 214 to the P-CSCF 140. Again an exchange of AA Request 216 and AA Answer 218 occur with the PCRF 138 for final QoS profile authorization and conformation, and the P-CSCF 140 sends a SIP 200 OK 220 to the IMS UA 124 the IMS UA 124 then sends an HTTP 200 OK 222 to the SCL 114. At this point, the application can begin transmitting data in flow 224.

Figure 6:
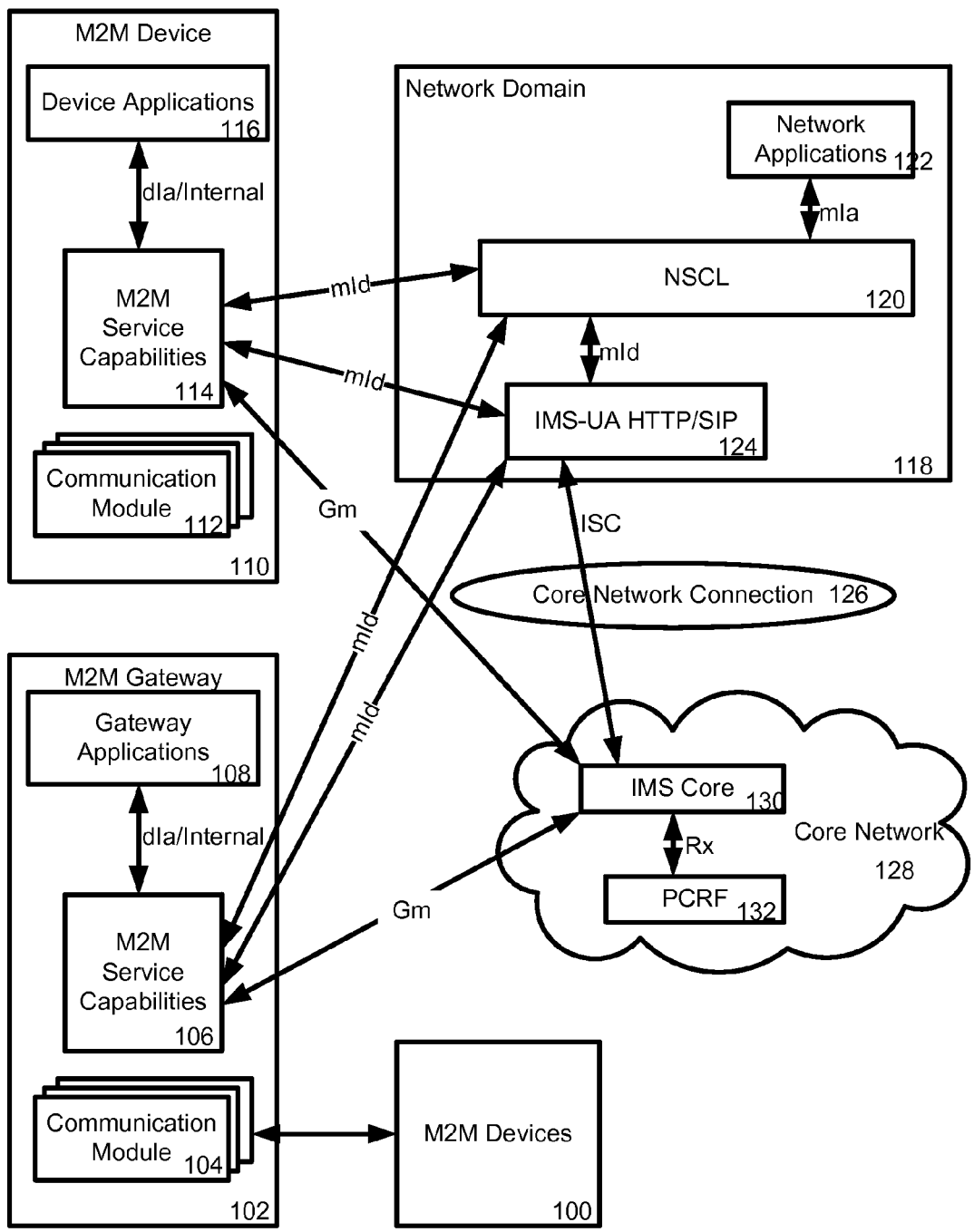
FIG. 6 a block diagram illustrating a network architecture for supporting QoS for M2M devices that are SIP enabled.

FIG. 6 illustrates architecture for an embodiment where the M2M device has a SIP Interface and an IMS subscription. The architecture of FIG. 6 is similar to that illustrated in FIG. 1, with the addition that M2M Service Capabilities 114 and 106 can make use of a Gm interface to directly access the IMS core 130. In this case the IMS UA 124 has an IMS Service Control (ISC) interface with the IMS core. The D/G SCL 114 and 106 each have a Gm interface as well with the IMS core. The call flows depicting the two call options in the first case are illustrated in FIGS. 7 and 8.

Figure 7:
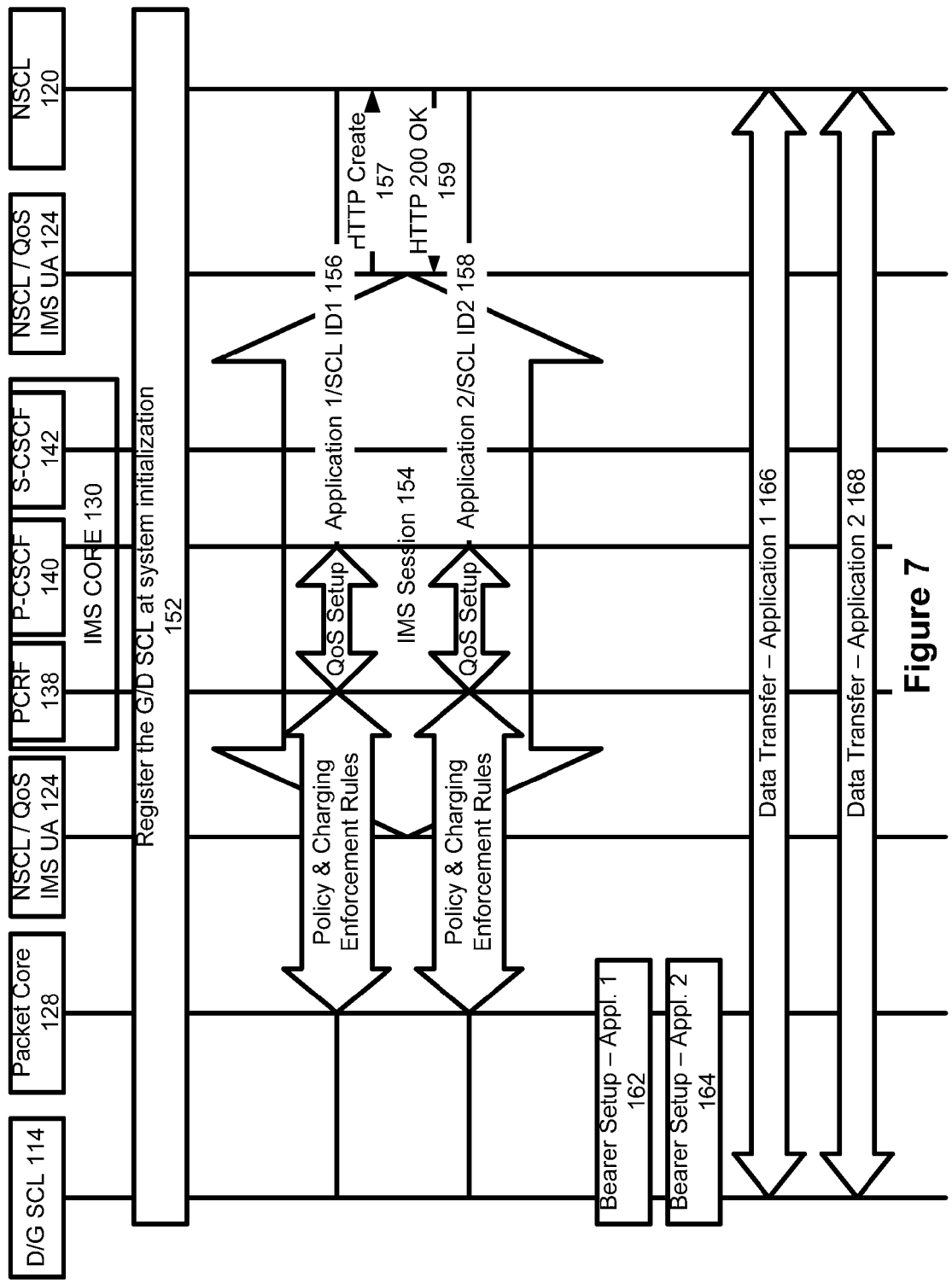
FIG. 7 is a call flow diagram illustrating an exemplary SIP-based method equivalent to the method illustrated in FIG. 2.

One skilled in the art will appreciate that the call flow of FIG. 7 is a SIP equivalent to the HTTP based call flow of FIG. 2. Similarly, FIG. 8 is a SIP equivalent to the HTTP based call flow of FIG. 3. FIG. 9 similarly illustrates the IMS session setup of a D/G SCL initiated context for a SIP based device.

As shown in FIG. 7, the G/D SCL 114 registers with the IMS core network 130 if it had not already done so in 152. If the G/D SCL 114 is already registered with the IMS core network 130, step 152 can be bypassed. The G/D SCL 114 establishes an IMS session 154 if one is not available for use. If one is available for use, the G/D SCL 134 modifies the session to add a new IP flow based on the requested QoS profile. During the IMS session initialization and/or modification of this exemplary embodiment, the IMS UA 124 sends an HTTP Create message 157 to the NSCL 120, which replies with HTTP 200 OK 159 in order to confirm the requested QoS with the M2M NSCL 120 The illustrated exemplary call flow shows two IP flows 156 and 158 with different QoS profiles belonging to two different M2M applications. In this exemplary embodiment, the application ID can be included at the SDP level and not the session level, as discussed above. In this illustrated embodiment, the interaction between the IMS core 130 and the PCRF 138 can be based on 3GPP TS 29.214, while the interaction between the PCRF and the packet core network for QoS enforcement is based on 3GPP TS 29.212: "3rd Generation Partnership Project; Technical Specification Group Core Network and Terminals; Policy and Charging Control (PCC) over Gx/Sd reference point", the relevant teachings of which are incorporated by reference. One skilled in the art will appreciate that the interactions between the IMS UA 124 and the NSCL 120 in this illustrative example is shown as using HTTP. Following the successful IMS session establishment and/or modification, depending on the case, the SCL 114 establishes a bearer for application 1 in step 162. In 164, the SCL establishes a bearer for application 2. Data transfer for application 1 can commence in flow 166 while data transfer for application 2 can commence in flow 168. One skilled in the art will appreciate that in this embodiment, a single IMS session is used to support multiple IP flows, one for each M2M application. The number of simultaneous IP flows to be supported within a single IMS session is implementation dependent. As such, if need be, multiple IMS sessions can be initiated by the IMS UA.

Figure 8:
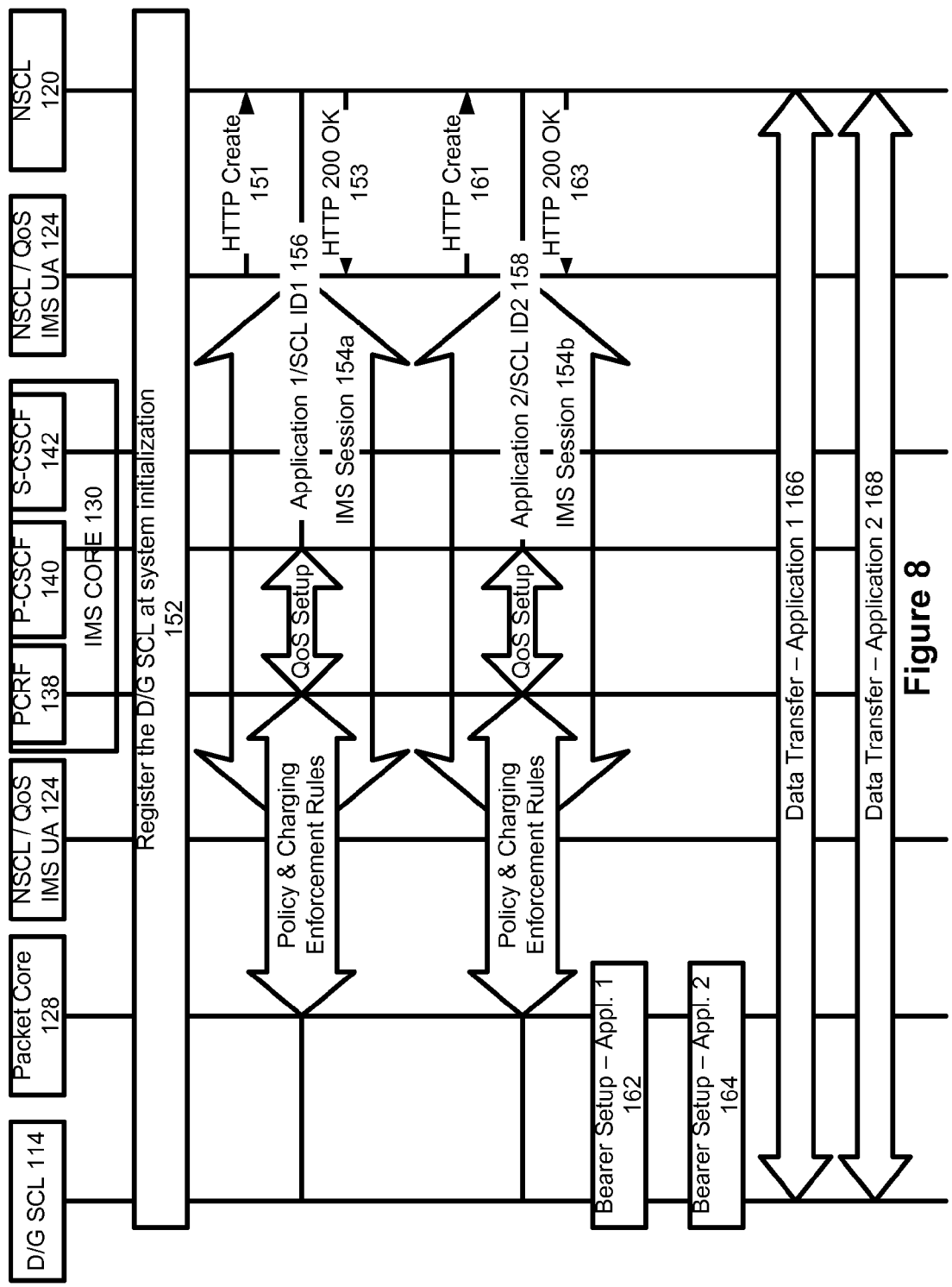
FIG. 8 is a call flow diagram illustrating an exemplary SIP based method equivalent to the method illustrated in FIG. 3.
Figure 9:
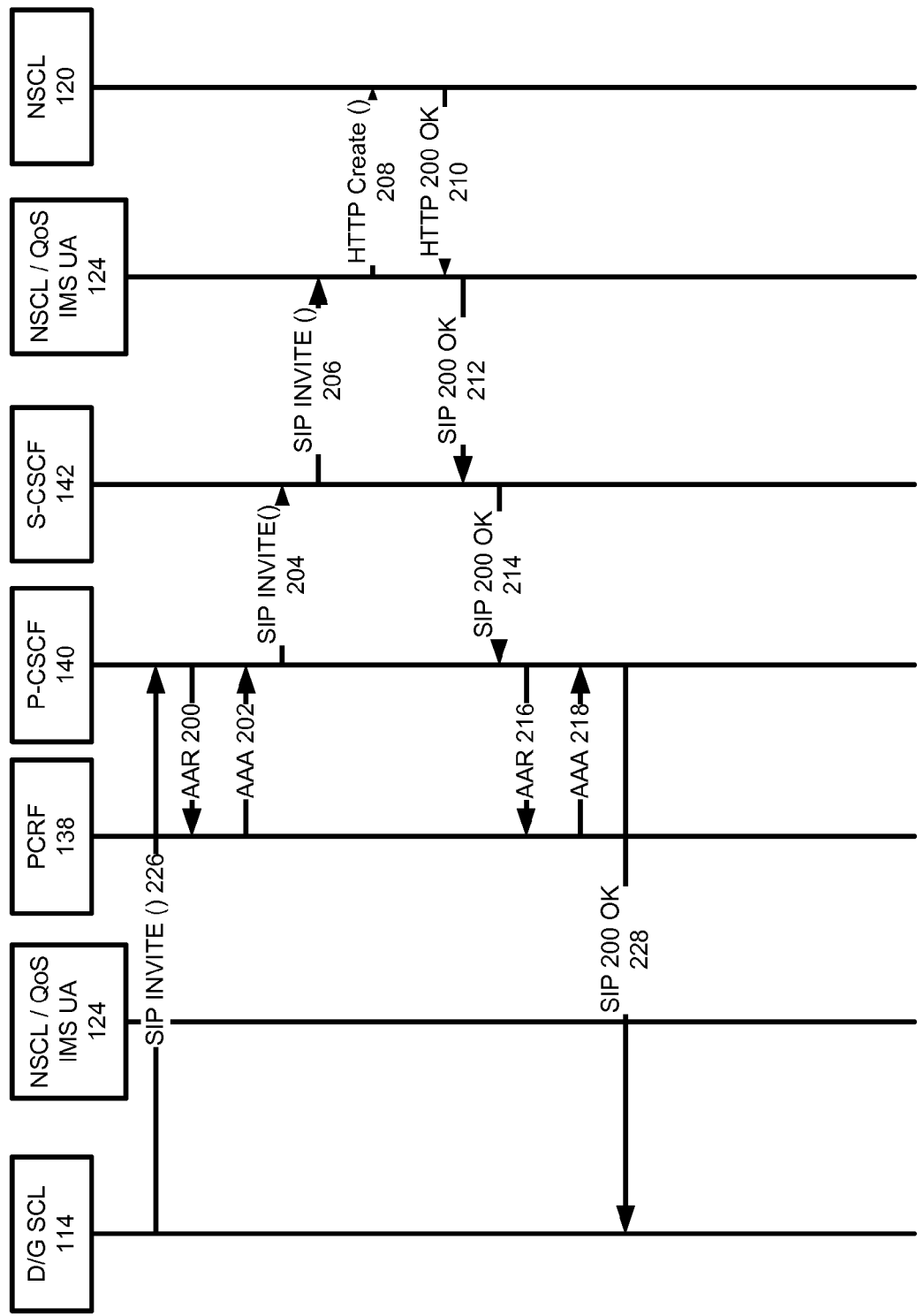
FIG. 9 is a call flow diagram illustrating an exemplary SIP based method of establishing a session initiated by the D/G SCL.

FIG. 8 illustrates the use of an end-to-end SIP connection to implement the second option of using one IMS session per application. Furthermore in this option, the application ID can be included at the IMS session level.

The G/D SCL 114 registers with the IMS core network 130 in 152 if it had not already done so. If the G/D SCL 114 is already registered this step can be omitted. The G/D SCL 114 establishes two IMS sessions 154a and 154b, one for each application ID 156 and 158. Each of the created IMS sessions 154a and 154b can request the QoS profile needed for the application. The application ID can be included at the session level which may allow for proper charging. In the illustrated embodiment, the interaction between the IMS core 130 and the PCRF 138 may be based on 3GPP TS 29.214, while the interaction between the PCRF 138 and the packet core network for QoS enforcement can be based on 3GPP TS 29.212 One skilled in the art will notice that in the illustrative embodiment of FIG. 8, interaction between the IMS UA 124 and the NSCL 120 is performed using HTTP. As such the IMS UA 124 issues an HTTP create 151 to the NSCL 120, and receives an HTTP 200 OK 153 in reply during the establishment of IMS session 154a. During establishment of 154b, HTTP Create message 161 and HTTP 200 OK 163 are exchanged as described above. The IMS UA 124 returns an HTTP 200 OK response 156 to the SCL 114 for session 154a, and HTTP 200 OK response 158 for session 154b. The SCL 114 establishes a bearer 162 for application 1 and a bearer 164 for application 2. Data transfer for application 1 can commence over flow 166 and data transfer for application 2 can commence over flow 168.

As shown in FIG. 9, the SCL 114 issues a SIP Invite 226 to the P-CSCF 140. This triggers the exchange of AA-Request 200 and AA Answer 202 with the PCRF 138 to authorize the QoS profile, followed by a SIP Invite 204 issued to the S-CSCF 142. The S-CSCF 142 sends SIP Invite 206 to the IMS UA 124 which delivers HTTP Create 208 to the NSCL 120. To complete the setup of the IMS session, the NSCL replies with HTTP 200 OK 210 to the IMS UA 124 to acknowledge the requested QoS profile, which then sends SIP 200 OK 212 to the S-CSCF 142, which sends SIP 200 OK 214 to the P-CSCF 140. Again an exchange of AA Request 216 and AA Answer 218 occur with the PCRF 138 for final QoS profile authorization and confirmation, and the P-CSCF 140 sends a SIP 200 OK 228 to the SCL 114. At this point, the application can begin transmitting data in an unillustrated data flow.

It should be noted that in the above described embodiments, there are multiple device/application pairings generating traffic streams in each IMS session. This is in clear distinction to the prior art. Furthermore, in a network that charges for the traffic flow, a single IMS session can generate charging events attributable to multiple accounts.

Figure 10:
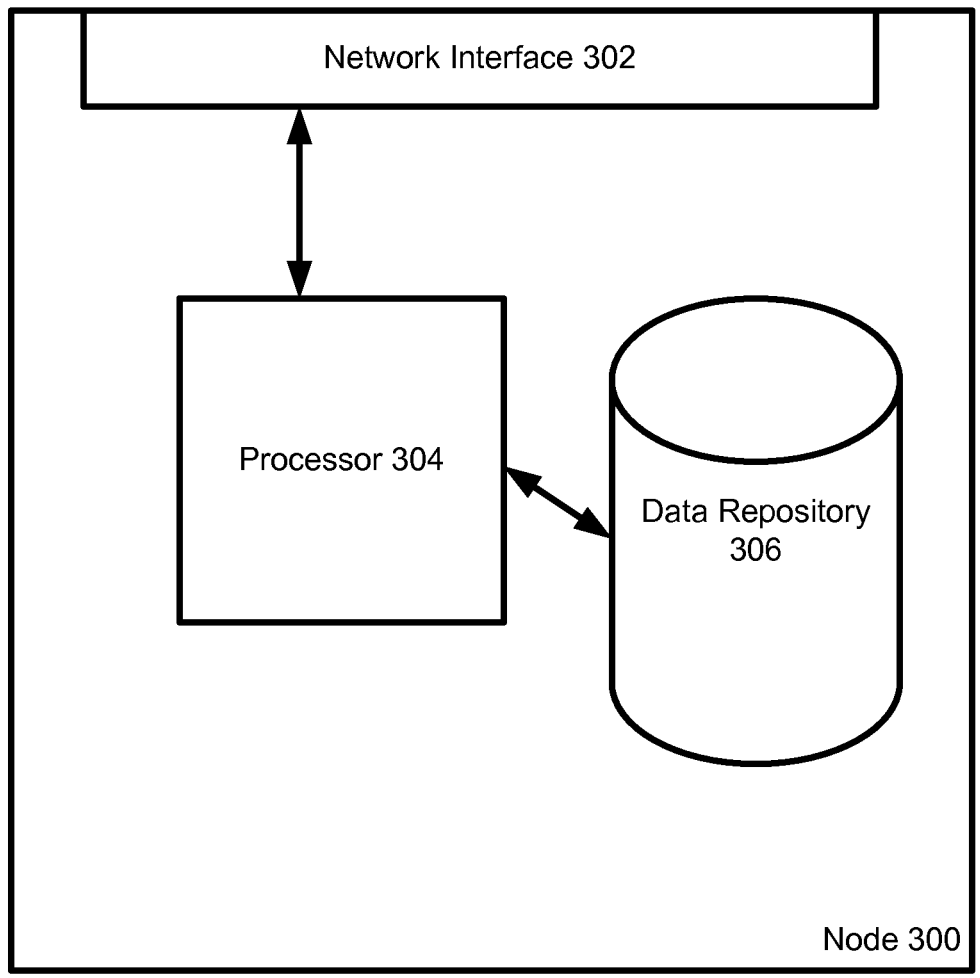
FIG. 10 illustrates an exemplary node according to an embodiment of the present invention.

FIG. 10 illustrates a node for implementing the above described methods. Node 300 includes a network interface 302 for interacting with other connected nodes and a processor for accessing instructions stored in repository 304. Upon execution of instructions stored in repository 304, the processor can carry out the method required to carry out the call flows described above. One skilled in the art will appreciate that the data repository 304 can also be used for storing information about the state of different sessions where required.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of supporting Quality of Servicee, QoS, in an Internet Mulitimedia Subsystem, IMS, network comprising:
   receiving, at a node in an IMS core network, a registration;
   receiving from a node associated with the received registration a request to create an IMS session to support a machine-to-machine data session;
   responsive to determining that a suitable IMS session already exists, modifying session information associated with the suitable IMS session to allow the suitable session to carry a content stream associated with the request to create a session, and to adjust an existing quality of service associated with the suitable session in accordance with the received request to create an IMS session.

2. The method of claim 1 wherein the suitable IMS session contains data streams associated with a plurality of requests to create IMS sessions received from the same application type.

3. The method of claim 2 wherein an application ID is included in IMS session level data associated with the suitable IMS session.

4. The method of claim 1 wherein the suitable IMS session contains data streams associated with a plurality of device and application pairings.

5. The method of claim 4 wherein an application ID is included with an SDP associated with the suitable IMS session.

6. The method of claim 1 wherein the node in the IMS core network is a Proxy Call Session Control Function (P-CSCF).

7. The method of claim 6 wherein the step of modifying session information includes signaling between the P-CSCF and the Policy and Charging Rule Function and the Serving Call Session Control Function.

8. The method of claim 1 wherein the steps of receiving a registration and receiving a request to create an IMS session include receiving a registration requests and a request to create an IMS session through a message delivered using the hypertext transfer protocol.

9. The method of claim 1 wherein the steps of receiving a registration and receiving a request to create an IMS session include receiving a registration requests and a request to create an IMS session through a message delivered using the Session Initiation Protocol.

10. A method for establishing an Internet Multimedia Subsystem, IMS, session on behalf of a machine-to-machine device, the IMS session having an associated Quality of Service, QoS, policy, the method comprising:
    receiving, from a requesting node, a request for establishment of an IMS session having a QoS policy, the requested IMS session terminating at a machine-to-machine device;
    registering the requested session with an instruction to a node in an IMS Core Network to modify QoS parameters of an existing IMS session in accordance with the QoS policy of the requested session; and
    upon receipt of an indication that the modification of the QoS parameters have been completed, creating a connection between the requesting node and a second terminal node using the existing IMS session, and informing both the requesting node and the second terminal node of the connection parameters.

11. The method of claim 10 wherein the received request is an HTTP request received from the machine-to-machine device.

12. The method of claim 11 wherein the request is received from a gateway acting on behalf of the device.

13. The method of claim 10 wherein the request is received from a network service capability layer.

14. The method of claim 10 wherein the node in the IMS core network is a Proxy Call Session Control Function.

15. The method of claim 10 wherein the requesting node is one of a machine-to-machine device and a machine-to-machine device gateway, and the second terminal node is a network service capacity layer.

16. The method of claim 10 wherein the requesting node is a network service capacity layer and the second terminal node is one of a machine-to-machine device and a machine-to-machine device gateway.

17. A machine-to-machine user agent node comprising:
    a network interface for interacting with external nodes in a network;
    a data repository for storing instructions; and
    a processor, which upon execution of instructions stored in the data repository:

receives, over the network interface, requests for establishing an Internet Multimedia Subsystem, IMS, session having a Quality of Service, QoS, policy;

transmits to a node in an IMS Core Network, over the network interface, a request to register the requested session with an instruction to modify QoS parameters of an existing IMS session in accordance with the policy of the requested session; and creating a connection between a node that issued the received request and a second terminal node, the connection using the existing IMS session, to satisfy the received request.

\* \* \* \* \*